(12) United States Patent
Aikawa et al.

(10) Patent No.: US 10,883,584 B2
(45) Date of Patent: Jan. 5, 2021

(54) DAMPER DEVICE (71) Applicant: EXEDY Corporation, Neyagawa (JP)

(72) Inventors: Masataka Aikawa, Neyagawa (JP); Hiroki Matsuo, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 42 days.

(21) Appl. No.: 16/372,259

(22) Filed: Apr. 1, 2019

(65) Prior Publication Data
US 2019/0346030 A1 Nov. 14, 2019

(30) Foreign Application Priority Data

May 8, 2018 (JP) .................................. 2018-089610

(51) Int. Cl.
F16F 15/129 (2006.01)
F16F 15/123 (2006.01)
(Continued)

(52) U.S. Cl.
CPC ......... F16H 45/02 (2013.01); F16D 25/0638 (2013.01); F16F 15/129 (2013.01);
(Continued)

(58) Field of Classification Search
CPC ............. F16H 45/02; F16H 2045/0215; F16H 2045/0221; F16H 2045/0226;
(Continued)

(56) References Cited

U.S. PATENT DOCUMENTS 4,643,289 A 2/1987 Yoneda et al.
4,727,767 A * 3/1988 Aiki ..................... F16F 15/139
192/213.31
(Continued)

FOREIGN PATENT DOCUMENTS

EP 0173838 A1 3/1986
EP 2975294 A2 1/2016
JP S61-20926 U 2/1986

OTHER PUBLICATIONS

Extended European Search Report dated Oct. 15, 2019 for corresponding European Application No. 19170481.6, 8 pp.

Primary Examiner — Mark A Manley
(74) Attorney, Agent, or Firm — United IP Counselors. LLC (57) ABSTRACT A damper device is disclosed. The damper device includes first and second side plates opposed in an axial direction, a hub flange, elastic members, a first friction member, and an oil supply portion. The first and second side plates has an annular shape. The hub flange, including a boss portion and a flange portion, is rotatable relative to the first and second side plates. The flange portion is disposed between the first and second side plates in the axial direction. The elastic members elastically couple the hub flange and both the first and second side plates in a rotational direction. The first friction member is disposed between the first side plate and the flange portion in the axial direction, and generates friction resistance when the first side plate and the hub flange rotate. The oil supply portion supplies lubricating oil from the second side plate to the first friction member.

12 Claims, 4 Drawing Sheets (51) Int. Cl.
*F16H 45/02* (2006.01)
*F16D 25/0638* (2006.01)

(52) U.S. Cl.
CPC .. *F16F 2230/04* (2013.01); *F16H 2045/0215* (2013.01); *F16H 2045/0221* (2013.01)

(58) Field of Classification Search
CPC .... F16D 25/0638; F16D 13/648; F16D 13/72; F16D 13/74; F16D 3/66; F16D 2300/22; F16F 2230/04; F16F 15/123; F16F 15/129
See application file for complete search history.

(56) References Cited

U.S. PATENT DOCUMENTS

| | | | | |
|---|---|---|---|---|
| 4,813,523 A | * | 3/1989 | Adachi | F16F 15/1238 192/213.22 |
| 5,975,271 A | | 11/1999 | Iwata | |
| 6,302,799 B1 | * | 10/2001 | Hashimoto | F16F 15/1238 192/213.31 |

* cited by examiner

DAMPER DEVICE

CROSS-REFERENCE TO RELATED APPLICATIONS

This application claims priority to Japanese Patent Application No. 2018-089610, filed May 8, 2018. The contents of that application are incorporated by reference herein in their entirety.

TECHNICAL FIELD

The present disclosure relates to a damper device, particularly to a damper device in which lubricating oil is supplied to respective components.

BACKGROUND ART

Damper devices are provided for inhibiting noise and for inhibiting vibration transmitted to a transmission from a drive source such as an engine or so forth. As this type of damper device, there has been provided a damper device configured to lubricate a friction member with lubricating oil as described in Japan Utility Model Application Publication No. S61-20926.

The damper device described in Japan Utility Model Application Publication No. S61-20926 includes a hub including an annular flange on the outer periphery thereof and a pair of side plates disposed on the both sides of the flange. The flange and the pair of side plates are elastically coupled in a rotational direction by a plurality of coil springs. Additionally, friction washers are disposed between the flange and the pair of side plates. These components form a friction mechanism for generating a hysteresis torque.

The hub is provided with an oil pathway radially penetrating therethrough. Additionally, an output shaft is spline-coupled to the hub. Lubricating oil is supplied to the hub from the output shaft, and is then supplied to members such as the friction washers through the oil pathway of the hub.

In the device described in Japan Utility Model Application Publication No. S61-20926, the lubricating oil passes through the oil pathway provided in the interior of the output shaft, then flows to the outside of the output shaft, and further flows from the inner peripheral side of the hub to the outer peripheral side of the hub through the oil pathway provided in the hub.

However, chances are that such an oil pathway as shown in FIG. 1 of Japan Utility Model Application Publication No. S61-20926 cannot be provided in the interior of the output shaft. In such a case (e.g., when an oil pathway is provided as shown in FIG. 2 of Japan Utility Model Application Publication No. S61-20926), the lubricating oil cannot be directly supplied to the friction mechanism. Because of this, a stable hysteresis torque cannot be obtained.

BRIEF SUMMARY

It is an object of the present disclosure to enable sufficiently supplying lubricating oil to a friction mechanism and enable obtaining a stable hysteresis torque even when the lubricating oil cannot be directly supplied to the friction mechanism through an oil pathway of an output shaft and that of a hub.

(1) A damper device according to the present disclosure includes first and second side plates each having an annular shape, a hub flange, a plurality of elastic members, a first friction member and an oil supply portion. The first and second side plates are disposed in opposition to each other in an axial direction, and each includes an opening in a center part thereof. The hub flange is rotatable relative to the first and second side plates. The hub flange includes a boss portion and a flange portion. The flange portion extends radially outward from the boss portion, and is disposed between the first and second side plates in the axial direction. The plurality of elastic members elastically couple the hub flange and both the first and second side plates in a rotational direction. The first friction member is disposed between the first side plate and the flange portion in the axial direction, and generates friction resistance when the first side plate and the hub flange are rotated relative to each other. The oil supply portion is provided in the flange portion, and supplies a lubricating oil supplied thereto from a second side plate side to the first friction member.

When the first side plate and the hub flange are herein rotated relative to each other, the first friction member disposed therebetween generates friction resistance. A hysteresis torque is generated by the friction resistance, whereby vibration and noise are inhibited.

Additionally, the first friction member is supplied with the lubricating oil supplied thereto from the opening of the center part of the second side plate through the oil supply portion provided in the flange portion. Because of this, the lubricating oil can be sufficiently supplied to the first friction member without providing an output shaft with a special oil pathway. Therefore, a stable hysteresis torque can be obtained.

(2) Preferably, the oil supply portion is an oil supply hole shaped to penetrate the flange portion in the axial direction.

The lubricating oil, supplied from the second side plate side, flows through the oil supply hole of the flange portion in the axial direction, and is supplied to the first friction member disposed on a first side plate side. Because of this, the first friction member can be lubricated with a simple configuration.

(3) Preferably, the first friction member has an annular shape and includes an opening in a center part thereof. Additionally, the oil supply portion is disposed on a further radially inner side than an inner peripheral end of the first friction member.

Here, the lubricating oil flows out from the oil supply portion toward the opening of the first friction member. In other words, the lubricating oil is not prevented from flowing out from the oil supply portion by a lateral surface of the first friction member. It should be noted that the lubricating oil, when flowing out to a region including the opening of the first friction member, is supplied to a region including a friction material disposed on the outer peripheral side by centrifugal forces.

(4) Preferably, the damper device further includes a pressing plate. The pressing plate is disposed between the first side plate and the first friction member, and presses the first friction member onto the flange portion. Additionally, the pressing plate includes a restriction portion. The restriction portion restricts the lubricating oil discharged from the oil supply portion from flowing toward the first side plate.

The lubricating oil, discharged from the oil supply portion, is herein supplied to the first friction member. The lubricating oil, supplied to the first friction member, is restricted from further flowing toward the first side plate by the restriction portion of the pressing plate. Because of this, the lubricating oil is supposed to be accumulated in a region including the first friction member, whereby the first friction member can be sufficiently lubricated.

(5) Preferably, the damper device further includes an oil receiving portion. The oil receiving portion is provided radially outside the oil supply portion, and receives the lubricating oil supplied thereto from an inner peripheral side of the oil supply portion.

The oil receiving portion herein receives the lubricating oil supplied thereto from the inner peripheral side of the oil supply portion. In other words, the oil receiving portion restricts occurrence of a situation that the lubricating oil flows out to the outer peripheral side by centrifugal forces without passing through the oil supply portion. Because of this, the lubricating oil is sufficiently supplied to the first friction member through the oil supply portion.

(6) Preferably, the first side plate has an inner diameter set such that an inner periphery of the first side plate is located radially inside a radial position of the oil supply portion.

The inner peripheral part of the first side plate herein restricts flow of the lubricating oil supplied to the first friction member from the oil supply portion. Because of this, the lubricating oil is supposed to be accumulated in the region including the first friction member, whereby the first friction member can be sufficiently lubricated.

(7) Preferably, the flange portion includes a protruding portion protruding toward the first side plate. Additionally, the protruding portion radially positions the first friction member by making contact with an outer peripheral surface of the first friction member.

The lubricating oil can be efficiently supplied to the first friction member by providing the oil supply portion on the inner peripheral side of the first friction member. In this configuration, however, radial positioning of the first friction member is made difficult on the inner peripheral side of the first friction member.

In view of this, the flange portion is provided with the protruding portion making contact with the outer peripheral surface of the first friction member, and radial positioning of the first friction member is made by the protruding portion.

(8) Preferably, the damper device further includes a second friction member. The second friction member is disposed between the second side plate and the flange portion in the axial direction, and generates friction resistance when the second side plate and the hub flange are rotated relative to each other.

Here, the lubricating oil can be supplied to the second friction member as well by the oil supply portion.

(9) Preferably, the second friction member has an annular shape and includes an opening in a center part thereof. Additionally, the oil supply portion is disposed on a further radially inner side than an inner peripheral end of the second friction member.

(10) Preferably, the first friction member includes friction materials fixed to both lateral surfaces thereof.

(11) Preferably, the first friction member includes a friction material fixed to only one lateral surface thereof located on an opposite side of the other lateral surface thereof opposed to the flange portion. Additionally, the flange portion includes a friction material fixed to a part thereof with which the first friction member makes contact.

(12) Preferably, the first and second side plates include a plurality of holding portions on an outer peripheral side of the openings thereof. Additionally, the flange portion includes a plurality of accommodation portions in corresponding positions to the plurality of holding portions. Moreover, the plurality of elastic members are held by the plurality of holding portions while being accommodated in the plurality of accommodation portions.

Overall, according to the present disclosure described above, without providing an output shaft with a special oil pathway, lubricating oil can be sufficiently supplied to a friction mechanism and a stable hysteresis torque can be obtained.

DETAILED DESCRIPTION

[Configuration]

Figure 1:
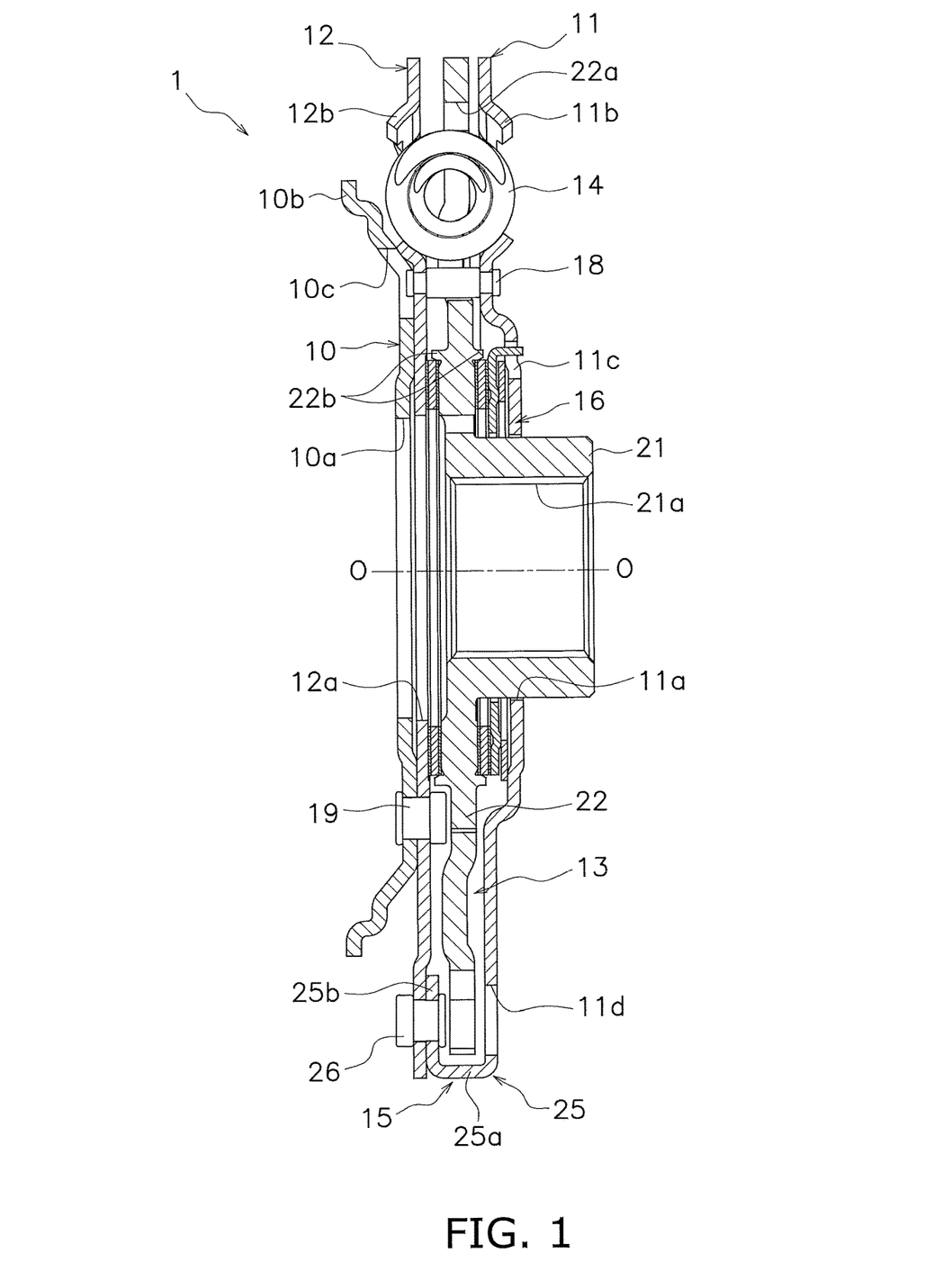
FIG. 1 is a cross-sectional view of a damper device according to an embodiment of the present disclosure.
Figure 2:
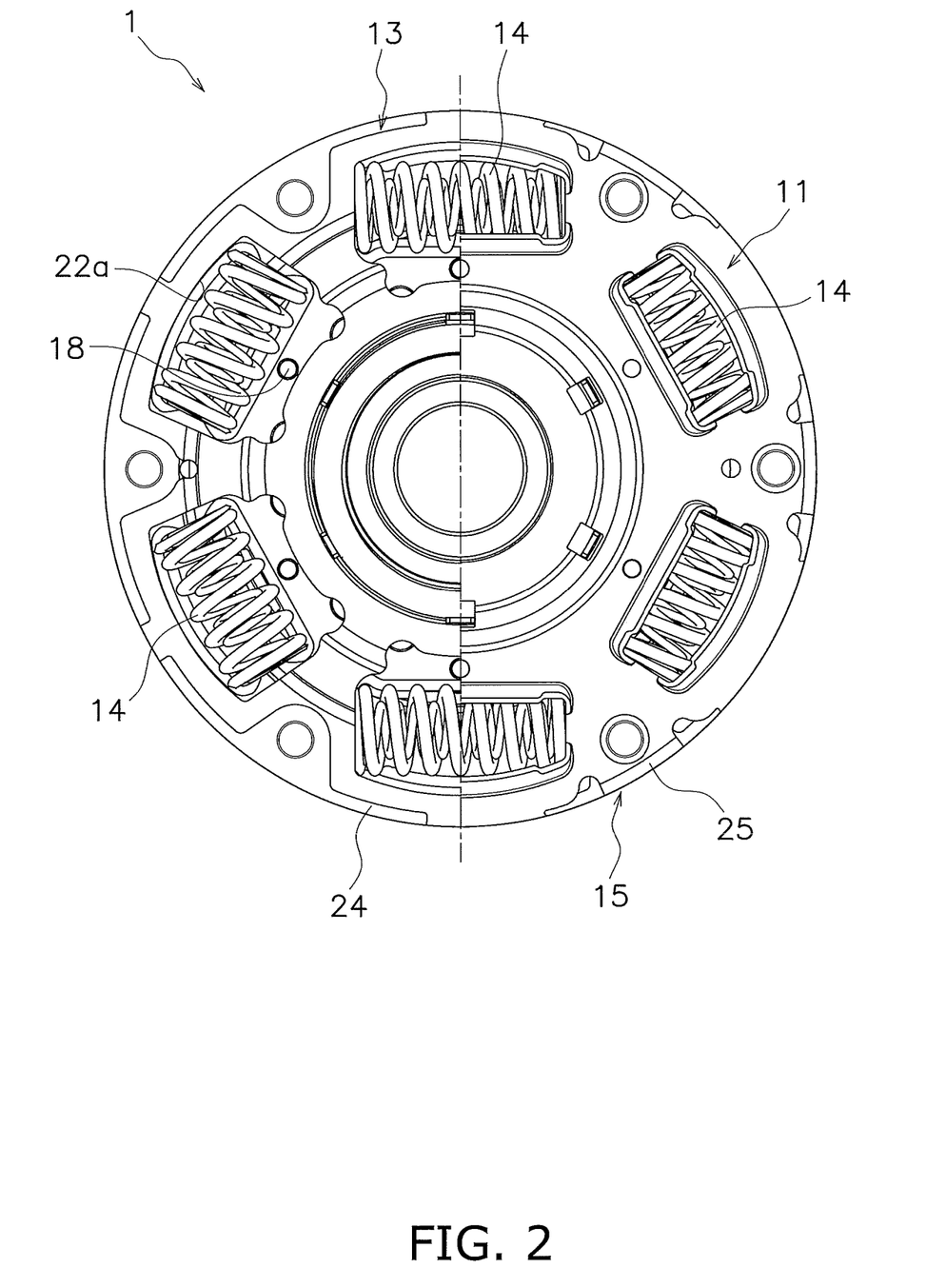
FIG. 2 is a front view of FIG. 1.

FIGS. 1 and 2 show a damper device 1 according to an embodiment of the present disclosure. FIG. 1 is a cross-sectional view of the damper device 1, whereas FIG. 2 is a front view thereof. It should be noted FIG. 2 is a diagram seen from a transmission side, and shows a condition of the damper device 1 from part of which components are detached. In FIG. 1, line O-O indicates the rotational axis (i.e., the rotational center line) of the damper device 1. In FIG. 1, a drive source (an engine, a motor, etc.) is disposed on the left side, whereas a transmission (not shown in the drawing) is disposed on the right side.

The damper device 1 transmits a torque inputted thereto from the drive source toward the transmission and also attenuates torque fluctuations. The damper device 1 includes an input plate 10, first and second side plates 11 and 12, a hub flange 13, a plurality of torsion springs 14, a stopper mechanism 15 and a hysteresis torque generating mechanism 16.

The input plate 10 is disposed closest to the drive source in the damper device 1. The input plate 10 has a disc shape. The input plate 10 includes an opening 10a in the center part thereof, and also includes an engaging portion 10b in the outer peripheral part thereof. The engaging portion 10b is provided to slant toward the drive source. The torque from the drive source is inputted to the damper device 1 through the engaging portion 10b. Additionally, the input plate 10 is provided with a plurality of swaging holes 10c on the inner peripheral side of the engaging portion 10b.

The first and second side plates 11 and 12 are disposed in axial opposition to each other at a predetermined interval. The first and second side plates 11 and 12 are fixed by a plurality of rivers 18 so as to be immovable in both axial and rotational directions. The first side plate 11 is disposed on a transmission side, whereas the second side plate 12 is disposed on a drive source side.

The first side plate 11 has a disc shape. The first side plate 11 includes an opening 11a provided in the center part thereof, a plurality of first holding portions 11b, a plurality of engaging holes 11c and a plurality of swaging holes 11d.

Each first holding portion 11b has a frame-like shape. Specifically, each first holding portion 11b includes an opened part, an inner peripheral holding part and an outer peripheral holding part. The inner peripheral holding part is formed by cutting and raising the inner peripheral end of the opened part, whereas the outer peripheral holding part is formed by cutting and raising the outer peripheral end of the opened part. The engaging holes 11c are provided in a radially intermediate part of the first side plate 11, whereas the swaging holes 11*d* are provided in the outer peripheral part of the first side plate 11.

The second side plate 12 has a disc shape, and is fixed at a radially intermediate part thereof to the input plate 10 by at least one rivet 19. The second side plate 12 includes an opening 12*a* provided in the center part thereof and a plurality of second holding portions 12*b*.

Similarly to each first holding portion 11*b*, each second holding portion 12*b* has a frame-like shape. Specifically, each second holding portion 12*b* includes an opened part, an inner peripheral holding part and an outer peripheral holding part. The inner peripheral holding part is formed by cutting and raising the inner peripheral end of the opened part, whereas the outer peripheral holding part is formed by cutting and raising the outer peripheral end of the opened part.

The hub flange 13 includes a boss portion 21 and a flange portion 22. The hub flange 13 is rotatable relative to the first and second side plates 11 and 12 in a predetermined angular range.

The boss portion 21 extends in the axial direction, and includes a spline hole 21*a* in the inner peripheral part thereof. An input shaft (not shown in the drawings) of the transmission is capable of being spline-coupled to the spline hole 21*a*.

The flange portion 22 extends radially outward from the boss portion 21, and is disposed axially between the first and second side plates 11 and 12. The flange portion 22 includes a plurality of openings functioning as accommodation portions 22*a*. The accommodation portions 22*a* are provided in corresponding positions to pairs of first and second holding portions 11*b* and 12*b* of the first and second side plates 11 and 12, respectively. As is obvious from FIG. 2, each accommodation portion 22*a* is shaped such that the inner peripheral part thereof further extends to the inner peripheral side than the opened parts of each pair of first and second holding portions 11*b* and 12*b*. Additionally, each of the rivets 18 fixing the first and second side plates 11 and 12 passes through the inner peripheral part of each accommodation portion 22*a*.

The plural torsion springs 14 are accommodated in the accommodation portions 22*a* of the hub flange 13, respectively, and are supported by the pairs of first and second holding portions 11*b* and 12*b* of the first and second side plates 11 and 12, respectively, so as to be immovable in both the axial direction and the radial direction. The torsion springs 14 elastically couple the hub flange 13 and both the first side plate 11 and the second side plate 12 in the rotational direction.

As shown in FIG. 2, the stopper mechanism 15 includes a plurality of cutouts 24 and a plurality of stoppers 25. The cutouts 24 are provided in the flange portion 22. The stoppers 25 are provided in in the outer peripheral part of the first side plate 11.

Each cutout 24 is provided on the outer peripheral surface of the flange portion 22 so as to have a predetermined length in the circumferential direction and have a predetermined width in the radial direction. Each stopper 25 includes a stopper body 25*a* and a fixation portion 25*b*. The stopper body 25*a* is formed by partially bending the outer peripheral part of the first side plate 11 to the second side plate 12 side. The fixation portion 25*b* is formed by further bending the distal end of the stopper body 25*a* to the inner peripheral side. The stopper body 25*a* passes through each cutout 24 in the axial direction, and the fixation portion 25*b* is fixed to the outer peripheral part of the second side plate 12 by each of a plurality of rivets 26.

With the configuration described above, the hub flange 13 and both the first side plate 11 and the second side plate 12 are rotatable relative to each other in an angular range that each stopper body 25*a* makes contact with the end surfaces of each cutout 24. In other words, when the stopper body 25*a* makes contact with one of the end surfaces of the cutouts 24, relative rotation is prevented between the hub flange 13 and both the first and second side plates 11 and 12.

Figure 3:
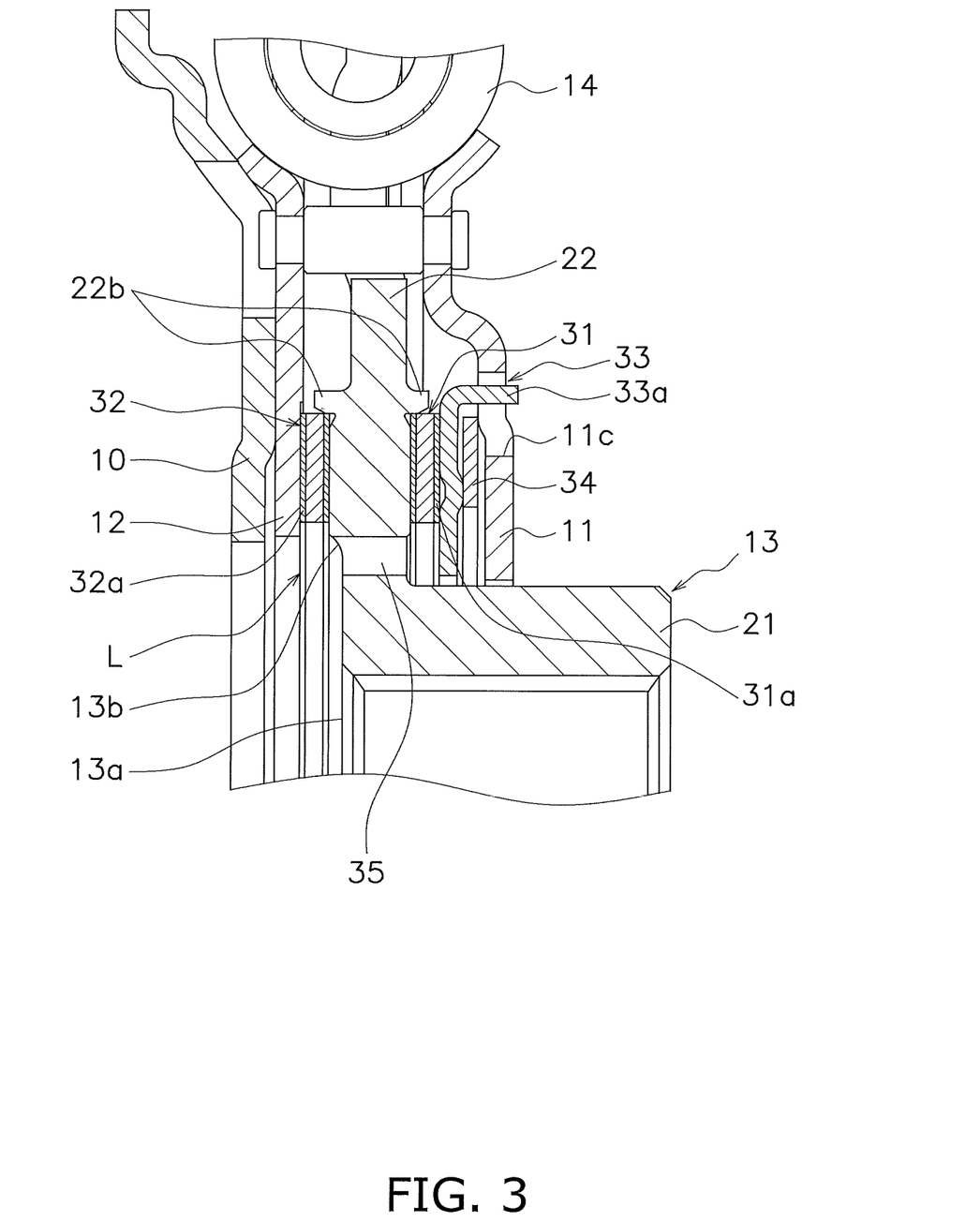
FIG. 3 is an enlarged view of part of FIG. 1.

As shown in FIG. 3, the hysteresis torque generating mechanism 16 includes a first friction member 31, a second friction member 32, a friction plate 33 (pressing plate) and a cone spring 34.

The first friction member 31 is an annular plate, and is disposed on the outer peripheral part of the boss portion 21 so as to make contact with the first side plate 11-side lateral surface of the inner peripheral part of the flange portion 22. On the other hand, the second friction member 32 is an annular plate, and is disposed between the inner peripheral part of the flange portion 22 and that of the second side plate 12. A pair of friction materials 31*a* is fixed to the both lateral surfaces of the first friction member 31, whereas a pair of friction materials 32*a* is fixed to the both lateral surfaces of the second friction member 32.

The friction plate 33 is disposed on the first side plate 11 side of the first friction member 31, whereas the cone spring 34 is disposed between the friction plate 33 and the first side plate 11, while being compressed therebetween. The friction plate 33 is provided with a plurality of engaging protrusions 33*a* in the outer peripheral part thereof. The engaging protrusions 33*a* are formed by partially bending the outer peripheral part of the friction plate 33 to the first side plate 11 side. The engaging protrusions 33*a* are engaged with the engaging holes 11*c* of the first side plate 11, respectively. Therefore, the friction plate 33 is non-rotatable relative to the first side plate 11.

In the configuration described above, the first friction member 31 is pressed against the flange portion 22 and the friction plate 33 with a predetermined pressing force, whereas the second friction member 32 is pressed against the flange portion 22 and the second side plate 12 with a predetermined pressing force. Therefore, when the hub flange 13 and both the first side plate 11 and the second side plate 12 are rotated relative to each other, friction resistance occurs between each of the first and second friction members 31 and 32 and the opponent members thereof. Accordingly, a hysteresis torque is generated.

[Configuration to Supply Lubricating Oil]

Lubricating oil is herein supplied to the hysteresis torque generating mechanism 16 on the inner peripheral side of the hub flange 13 from the second side plate 12 side. A direction in which the lubricating oil is supplied is depicted with arrow L in FIG. 3. A plurality of oil supply holes 35 are provided in a part of the hub flange 13, to which the lubricating oil is supplied, and axially penetrate therethrough. Specifically, the oil supply holes 35 are provided in the inner peripheral end of the flange portion 22 of the hub flange 13, and axially penetrate therethrough from the first side plate 11 side to the second side plate 12 side. The oil supply holes 35 are provided on a further radially inner side than the inner peripheral end of the first friction member 31 and that of the second friction member 32.

Additionally, as shown in FIG. 3, the hub flange 13 is provided with a recessed portion 13*a* axially recessed from the second side plate 12-side lateral surface thereof. The outer periphery of the recessed portion 13a approximately overlaps with a radially outermost part of each oil supply hole 35. Additionally, the recessed portion 13a includes an outer peripheral sidewall 13b made in the shape of a curved surface functioning as an oil receiving portion.

Therefore, the lubricating oil, supplied from the inner peripheral side of the input plate 10 and the second side plate 12, is supplied to the inner peripheral part of the second friction member 32 along the curved surface of the outer peripheral sidewall 13b of the recessed portion 13a. Simultaneously, the lubricating oil is also led to the oil supply holes 35 along the curved surface of the outer peripheral sidewall 13b of the recessed portion 13a. The lubricating oil, led to the oil supply holes 35, is supplied to the inner peripheral part of the first friction member 31 through the oil supply holes 35. It should be noted that the oil supply holes 35 are provided on the further radially inner side than the inner peripheral end of the first friction member 31 and that of the second friction member 32. Hence, the lubricating oil is neither prevented from flowing into the oil supply holes 35, nor prevented from flowing out from the oil supply holes 35.

With the configuration described above, the lubricating oil is supplied to the inner peripheral part of each first/second friction member 31, 32, and is further supplied to the friction materials 31a, 32a disposed on the outer peripheral side.

Additionally, each of the friction plate 33 and the first side plate 11 is shaped to have a smaller inner diameter than the first friction member 31. Therefore, the lubricating oil, when flowing out to the first friction member 31 side through the oil supply holes 35, can be inhibited from further flowing out to the axially outer side (the right side in FIG. 1) by these plates 33 and 11. In other words, the inner periphery of the friction plate 33 and that of the first side plate 11 function as restricting portions by which the lubricating oil, discharged from the oil supply holes 35, is restricted from flowing to the further axially outer side (the right side in FIGS. 1 and 3) from the first side plate 11. Because of this, the lubricating oil can be sufficiently supplied to the first friction member 31.

Likewise, the second side plate 12 is also shaped to have a smaller inner diameter than the second friction member 32. Therefore, the lubricating oil, supplied to the second friction member 32 from the recessed portion 13a, can be inhibited from flowing out to the further axially outer side (the left side in FIG. 1) by the second side plate 12. Because of this, the lubricating oil can be sufficiently supplied to the second friction member 32.

As described above, the lubricating oil is supplied to the first and second friction members 31 and 32 by the oil supply holes 35 and so forth. In the configuration described above, it is difficult to install a constituent element or elements for radially positioning the first and second friction members 31 and 32 on the inner peripheral side of the first and second friction members 31 and 32.

In view of this, the flange portion 22 is provided with annular protruding portions 22b axially protruding from the both lateral surfaces thereof. Moreover, the first and second friction members 31 and 32 make contact at the outer peripheral surfaces thereof with the protruding portions 22b, respectively. Accordingly, radial positioning is made for the first and second friction members 31 and 32.

[Assembly]

Now in assembling the present device, the input plate 10 is firstly fixed to the second side plate 12 by the at least one rivet 19. Then, the hysteresis torque generating mechanism 16 and the torsion springs 14 are assembled to the first side plate 11 and the hub flange 13, and the first side plate 11 and the second side plate 12 are fixed to each other by the rivets 18 and 26.

In fixing the first side plate 11 and the second side plate 12 to each other, the rivets 18 are swaged with use of the swaging holes 10c provided in the input plate 10, whereas the rivets 26 are swaged with use of the swaging holes 11d provided in the first side plate 11.

[Action]

When inputted from the drive source to the input plate 10, a torque is transmitted from the first and second side plates 11 and 12 to the hub flange 13 through the torsion springs 14. The torque, transmitted to the hub flange 13, is transmitted to the input shaft of the transmission coupled to the spline hole 21a of the boss portion 21.

In the aforementioned action, as described above, when the hub flange 13 and both the first side plate 11 and the second side plate 12 are rotated relative to each other, the friction materials 31a, 32a, fixed to the both lateral surfaces of each first/second friction member 31, 32, slide against other members, and friction resistance occurs. Accordingly, a hysteresis torque is generated, whereby torque fluctuations are attenuated.

On the other hand, during the aforementioned action, the lubricating oil is sufficiently and stably supplied to the first and second friction members 31 and 32 through the recessed portion 13a and the oil supply holes 35. Therefore, a stable hysteresis torque can be obtained.

OTHER EMBODIMENTS

The present disclosure is not limited to the embodiment described above, and a variety of changes or modifications can be made without departing from the scope of the present disclosure.

(a) The aforementioned embodiment has exemplified the configuration that the friction members 31 and 32 are provided on the both sides of the flange portion 22. However, the prevent disclosure is similarly applicable as well to a configuration that a friction member is provided on only one side of the flange portion.

Figure 4:
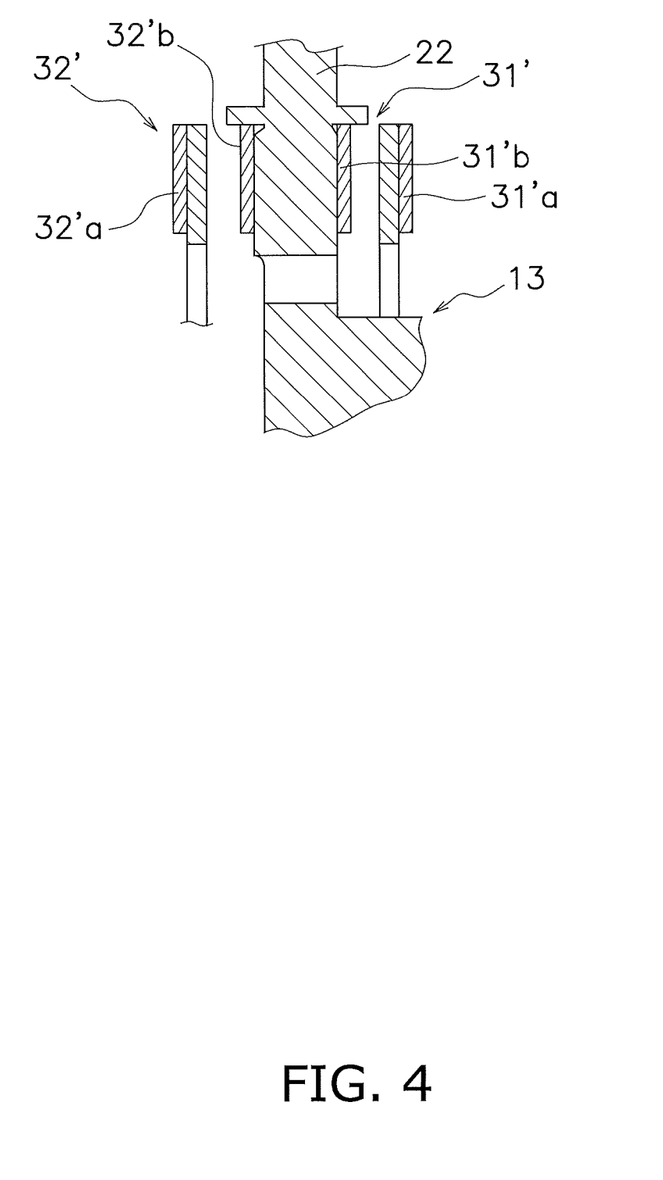
FIG. 4 is a cross-sectional exploded view of a hub flange and a friction member according to another embodiment.

(b) In the aforementioned embodiment, the friction members are fixed to the both lateral surfaces of each friction member 31, 32. However, as shown in FIG. 4, the flange portion 22 can be provided with friction materials 31'b and 32'b fixed to the surfaces thereof with which friction members 31' and 32' make contact. On the other hand, each friction member 31', 32' can be provided with a friction material 31'a, 32'a fixed to the axially outer side thereof (corresponding to the first side plate 11 side of the first friction member 31 and the second side plate 12 side of the second friction member 32 in the aforementioned embodiment).

REFERENCE SIGNS LIST

1 Damper device
11 First side plate
11b First holding portion
12 Second side plate
12b Second holding portion
13 Hub flange
13a Recessed portion
13b Outer peripheral sidewall
14 Torsion spring
16 Hysteresis torque generating mechanism
21 Boss portion 22 Flange portion
22a Accommodation portion
22b Protruding portion
31 First friction member
32 Second friction member
31a, 32a Friction material
33 Friction plate
35 Oil supply hole

What is claimed is:

1. A damper device comprising:
   first and second side plates each having an annular shape, the first and second side plates opposed to each other in an axial direction, the first and second side plates each including an opening in a center part thereof;
   a hub flange rotatable relative to the first and second side plates, the hub flange including a boss portion and a flange portion, the flange portion extending radially outward from the boss portion, the flange portion disposed between the first and second side plates in the axial direction;
   a plurality of elastic members elastically coupling the hub flange and both the first and second side plates in a rotational direction;
   a first friction member disposed between the first side plate and the flange portion in the axial direction, the first friction member configured to generate friction resistance when the first side plate and the hub flange are rotated relative to each other; and
   an oil supply portion provided in the flange portion radially inward from an inner peripheral edge of the first friction member, the oil supply portion configured to supply a lubricating oil from the second side plate to the first friction member through the flange portion.

2. The damper device according to claim 1, wherein the oil supply portion is an oil supply hole shaped to penetrate the flange portion in the axial direction.

3. The damper device according to claim 1, wherein the first friction member has an annular shape and includes an opening in a center part thereof, and the oil supply portion is disposed on a further radially inner side than an inner peripheral end of the first friction member.

4. The damper device according to claim 1, further comprising
   a pressing plate disposed between the first side plate and the first friction member, the pressing plate configured to press the first friction member onto the flange portion, wherein
   the pressing plate includes a restriction portion, the restriction portion configured to restrict the lubricating oil discharged from the oil supply portion from flowing toward the first side plate.

5. The damper device according to claim 1, further comprising
   an oil receiving portion provided radially outside the oil supply portion, the oil receiving portion configured to receive the lubricating oil supplied thereto from an inner peripheral side of the oil supply portion.

6. The damper device according to claim 1, wherein the first side plate has an inner diameter set such that an inner periphery of the first side plate is located radially inside a radial position of the oil supply portion.

7. The damper device according to claim 1, wherein the flange portion includes a protruding portion protruding toward the first side plate, and the protruding portion radially positions the first friction member by contacting an outer peripheral surface of the first friction member.

8. The damper device according to claim 1, further comprising:
   a second friction member disposed between the second side plate and the flange portion in the axial direction, the second friction member configured to generate friction resistance when the second side plate and the hub flange are rotated relative to each other.

9. The damper device according to claim 8, wherein the second friction member has an annular shape and includes an opening in a center part thereof, and the oil supply portion is disposed on a further radially inner side than an inner peripheral end of the second friction member.

10. The damper device according to claim 1, wherein the first friction member includes friction materials fixed to both lateral surfaces thereof.

11. The damper device according to claim 1, wherein the first friction member includes a friction material fixed to only one lateral surface thereof located on an opposite side from another lateral surface thereof opposed to the flange portion, and the flange portion includes a friction material fixed to a part thereof with which the first friction member makes contact.

12. The damper device according to claim 1, wherein the first and second side plates include a plurality of holding portions on an outer peripheral side of the openings thereof,
    the flange portion includes a plurality of accommodation portions in corresponding positions to the plurality of holding portions, and
    the plurality of elastic members are held by the plurality of holding portions while accommodated in the plurality of accommodation portions.

* * * * *